US008669518B2

(12) United States Patent
Ishiguro et al.

(10) Patent No.: US 8,669,518 B2
(45) Date of Patent: Mar. 11, 2014

(54) MASS SPECTROMETER

(75) Inventors: Kouji Ishiguro, Hitachinaka (JP); Hidetoshi Morokuma, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 210 days.

(21) Appl. No.: 13/168,427

(22) Filed: Jun. 24, 2011

(65) Prior Publication Data

US 2011/0315869 A1 Dec. 29, 2011

(30) Foreign Application Priority Data

Jun. 25, 2010 (JP) ................................ 2010-144404

(51) Int. Cl.
*B01D 59/44* (2006.01)
*H01J 49/00* (2006.01)

(52) U.S. Cl.
USPC ........... 250/282; 250/281; 250/283; 250/287; 250/288; 250/290; 250/291; 250/292; 250/293

(58) Field of Classification Search
USPC .................. 250/281–283, 287, 288, 290–293
See application file for complete search history.

(56) References Cited

U.S. PATENT DOCUMENTS

| | | | | |
|---|---|---|---|---|
| 3,800,151 | A * | 3/1974 | Hull et al. | 250/283 |
| 4,204,117 | A | 5/1980 | Aberle et al. | |
| 6,423,965 | B1 * | 7/2002 | Hashimoto et al. | 250/288 |
| 2003/0098414 | A1 * | 5/2003 | Uhlemann et al. | 250/305 |
| 2005/0199803 | A1 | 9/2005 | Ueno | |

FOREIGN PATENT DOCUMENTS

| | | | |
|---|---|---|---|
| EP | 0 100 525 | A2 | 2/1984 |
| JP | 60-165034 | A | 8/1985 |
| JP | 2005-259483 | | 9/2005 |

OTHER PUBLICATIONS

Extended European Search Report issued in European Patent Application No. 11005001.0, dated Feb. 24, 2012.
Japanese Office Action issued in Japanese Application No. 2010-144404 dated Jun. 25, 2013 with English Translation.

* cited by examiner

*Primary Examiner* — Jack Berman
*Assistant Examiner* — Meenakshi Sahu
(74) *Attorney, Agent, or Firm* — McDermott Will & Emery LLP

(57) ABSTRACT

An object of the present invention is to provide means for solving troubles. Examples of the troubles include sensitivity degradation and resolution degradation of a mass spectrometer, which are caused by an axis deviation of a component, particularly at least one orifice located between an ion source and a detector, to decrease the number of ions reaching the detector, and a variation in performance caused by exchange of components such as the orifice.

For example, the invention has the following configuration in order to solve the troubles. A mass spectrometer includes: an ion source; a detector that detects an ion; an orifice and a mass separator that are disposed between the ion source and the detector; and an axis adjusting mechanism that adjusts axis positions of the orifice and/or the mass separator such that an opening of the orifice and/or an incident port of the mass separator is disposed on a line connecting the ion source and an incident port of the detector.

5 Claims, 10 Drawing Sheets

1. For small axis deviation amount

2. For large axis deviation amount

MASS SPECTROMETER

BACKGROUND OF THE INVENTION

1. Field of the Invention

The present invention relates to a mass spectrometer, particularly to miniaturization and weight reduction of the mass spectrometer.

2. Description of the Related Art

In a mass spectrometer, a molecule or an atom as an analytical target is ionized, and the ions are transported in vacuum to be subjected to mass separation by utilizing an electric field and a magnetic field. The separated ions are detected by a detector. When a degree of vacuum in a vacuum vessel of a mass spectrometer is low, the ion collides with a residual gas molecule in the vacuum vessel at a number of times, and loses its charge due to exchange of charges or changes its traveling direction due to collision, whereby the number of ions reaching the detector is decreased to hardly perform correct mass spectrometry. Therefore, the degree of vacuum is set to be about $10^{-3}$ Pa or less in a spatial area of a vacuum chamber in which a mass separator such as a Q-mass filter and a detector such as a channeltron or a photomultiplier are disposed. For example, when a TOF (Time Of Flight) type mass spectrometer in which an ion reflector (reflector) and an MCP (multichannel plate) detector are combined is used under low vacuum, an adverse effect such as an interference between the ion and the residual gas molecule emerges for the same reason, and therefore the spatial area of the vacuum chamber in which the mass separator and the detector are disposed is set to be a high degree of vacuum.

Generally, in a mass spectrometer, a sample or an ionized sample is introduced to a vacuum side from an atmosphere, and the space in which a detector is disposed is maintained under high vacuum. Therefore, plural orifices are disposed between an ion source and the detector, and the space is evacuated in a differential pumping manner by a vacuum pump (for example, see Japanese Patent Application Laid-Open No. 2005-259483).

Recently, social concern with safety and security has been increasing in mainly security and food fields. Conventionally, a large-size mass spectrometer installed in an analytical laboratory has been used to sense a trace harmful substance. However, there is a need to rapidly measure the trace harmful substance on site, and miniaturization and weight reduction of the mass spectrometer have been attempted.

In order to miniaturize the mass spectrometer, it is necessary to miniaturize components constituting the mass spectrometer. A vacuum pump that is a component having a high structural ratio with respect to a size has been also miniaturized. Generally, with the miniaturization of the vacuum pump, a pumping rate is decreased to degrade the degree of vacuum of a vacuum vessel. When the degree of vacuum is degraded, as described above, the number of ions reaching the detector is decreased to hardly perform the mass spectrometry correctly. Therefore, a diameter of a fine hole of the orifice has been further reduced to decrease a flow rate in the vacuum vessel, thereby achieving the high degree of vacuum in the vacuum vessel.

Frequently a voltage is applied to the orifice so that the orifice extracts, accelerates, and focuses the ion beam, and the orifice is fixed to the vacuum vessel having a ground potential through an electric insulator such as alumina. An axis deviation of the orifice may be generated up to about 100 μm with respect to a correct center axis due to accumulation of machining tolerances such as deviations of a diameter of a hole in which the insulator of a vacuum chamber is attached, a diameter of the insulator, a diameter of a hole in which the insulator of the orifice is fitted, and a center axis of the fine hole of the orifice. Interference is generated between the ion beam and the orifice due to the axis deviation when the ion beam passes through the plural orifices, and the amount of ions reaching the detector is reduced to degrade apparatus performance such as the apparatus sensitivity and the resolution degradation.

By decreasing the mechanical tolerance of each component, the axis deviation amount can be decreased but the apparatus becomes expensive. It is necessary to adjust the axis deviation amount up to several tens of micrometers. Therefore, it is necessary to finely adjust the axis. When the component is exchanged for the purpose of orifice maintenance, the axis deviation amount after the re-assembly may be different from the axis deviation amount before the maintenance, and the amount of ion reaching the detector may vary. Therefore, the apparatus performances such as the apparatus sensitivity and resolution are changed and not stabilized. A sample gas adheres to a surface of the orifice to form an insulating film on the surface of the orifice, which results in a problem such that a drift of the ion beam is generated due to accumulation of charge. In order to prevent such a problem, sometimes the orifice is heated to a high temperature by a heater. In such a case, the orifice is thermally expanded. The temperature of the orifice changes depending on the time elapsed after the start-up of the apparatus, and a thermal expansion amount also changes, which results in a problem such that the axis deviation amount changes transiently.

An object of the present invention is to provide means for solving the problems of the related art. Examples of the problems include sensitivity degradation and resolution degradation of a mass spectrometer, which are caused by an axis deviation of a component, particularly at least one orifice, located between an ion source and a detector, to decrease the number of ions reaching the detector, and a variation in performances caused by exchange of components such as the orifice.

SUMMARY OF THE INVENTION

For example, the invention has the following configuration in order to solve the problems above.

A mass spectrometer includes: an ion source; a detector that detects an ion; an orifice and a mass separator that are disposed between the ion source and the detector; and an axis adjusting mechanism that adjusts axis positions of the orifice and/or the mass separator such that an opening of the orifice and/or an incident port of the mass separator is disposed on a line connecting the ion source and an incident port of the detector.

According to the invention, the center axis of the component located between the ion source and the detector, particularly the center axis of the orifice and an ion beam traveling axis connecting a beam outgoing axis of the ion source and an incident port axis of the detector can substantially be aligned with each other to minimize the axis deviation amount, so that the number of ions reaching the detector can be maximized. Therefore, the vacuum pump can be miniaturized, and the compact, light-weight, high-sensitivity, high-resolution mass spectrometer can be implemented.

DESCRIPTION OF THE PREFERRED EMBODIMENT

An exemplary embodiment of the invention will be described below with reference to the drawings.

Figure 1:
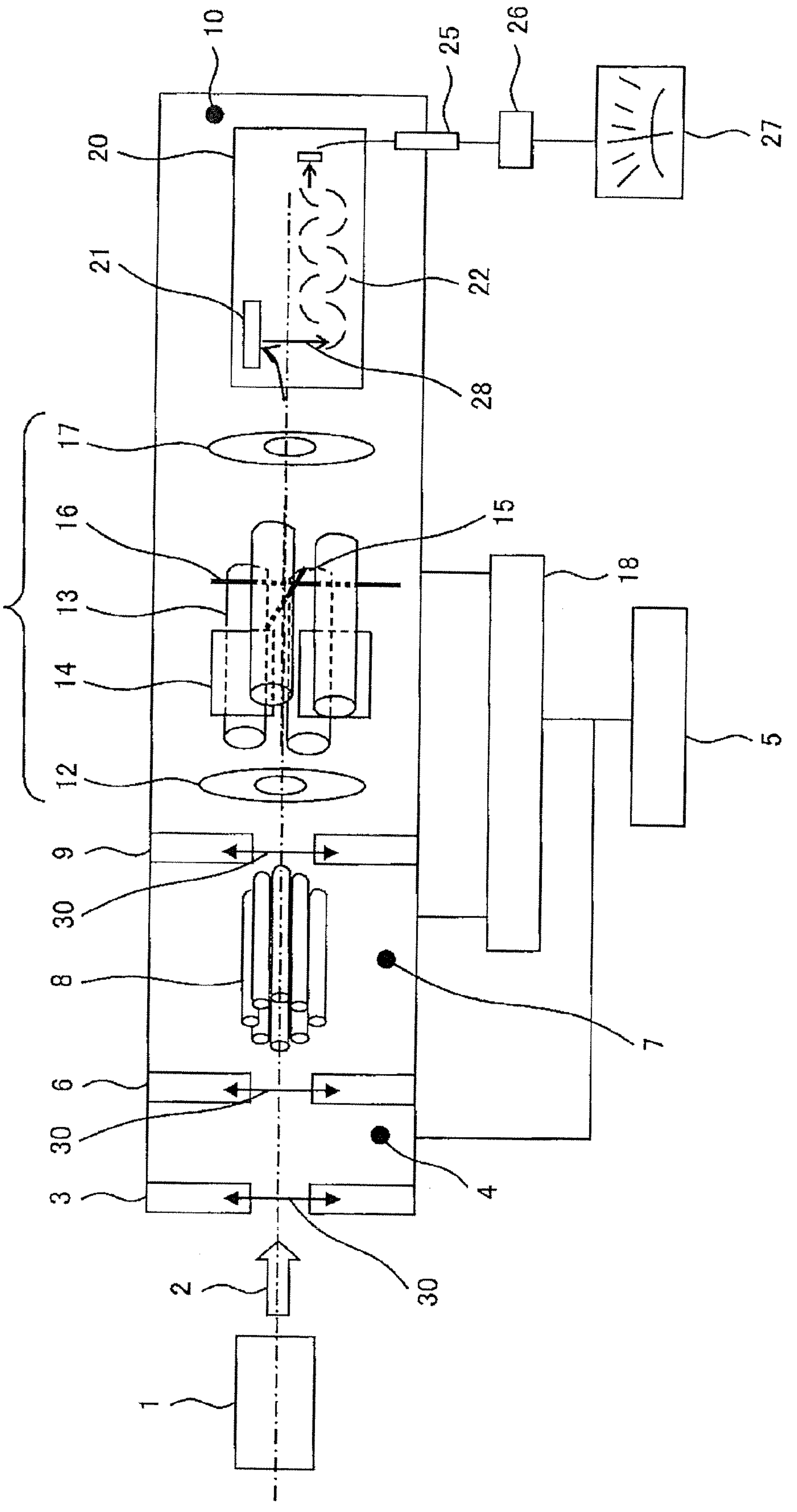
FIG. 1 illustrates an entire configuration of a mass spectrometer according to an embodiment of the invention.

FIG. 1 is a sectional view illustrating a conceptual configuration of a mass spectrometer according to an embodiment of the invention.

For example, electron ionization (EI), chemical ionization (CI), electron spray ionization (ESI), nano-electron spray ionization, atmospheric pressure chemical ionization (APCI), fast atom bombardment ionization (FAB), electric field ionization (FI), electric field desorption ionization (FD), matrix-assisted laser desorption ionization (MALDI), desorption electrospray ionization (DESI), desorption electrospray ionization (DART), or barrier discharge ionization is used for ionization of an ion source 1.

An ion beam 2 is extracted from the ion source 1 by an extraction electric field that is applied between a first orifice 3 and an ion source electrode (not illustrated). Air containing the ion beam 2 flows through a fine hole of the first orifice 3 in a first differential pumping chamber 4 connected to a rough vacuum pump 5.

Similarly, the air flows through a fine hole of a second orifice 6 in a second differential pumping chamber 7 connected to a second pumping port (low pumping speed side) of a main vacuum pump 18. An octopole 8 is disposed in the second differential pumping chamber 7. In the octopole 8, eight multipole rod electrodes are disposed in an axially symmetric manner in parallel with one another, a potential having an identical phase is provided to the rod electrodes that are opposite to each other, and a potential having a constant phase difference is provided to the adjacent rod electrode. In the octopole 8, an octopole high-frequency electric field is generated to form a potential that becomes convex on the axis, which allows the ion to be focused near the axis.

Potentials of tens volts are provided to the first orifice 3 and the second orifice 6 in order to extract the ion beam, and the ion is accelerated by a potential difference between the first orifice 3 and the second orifice 6.

The air containing the ion beam 2 flows through a fine hole of a third orifice 9 in an analytical chamber 10. The analytical chamber 10 is evacuated by connection with a first pumping port (high pumping speed side) of the main vacuum pump 18. A background of the main vacuum pump 18 is evacuated by the rough vacuum pump 5.

The analytical chamber 10 includes a quadrupole mass separator 11 and a detector 20. The quadrupole mass separator 11 includes a front electrode 12, a quadrupole rod 13, a blade electrode 14, a front wire 15, a rear wire 16, and a rear electrode 17. In the quadrupole rod 13, an identical AC voltage (identical amplitude and phase) is provided to the electrodes that are opposite each other, and an AC voltage whose phase is inverted is applied to the adjacent electrode. Generally the AC voltage ranges from several hundred volts to 5 kV and the frequency ranges from 500 kHz to 2 MHz. In a radial direction of the quadrupole rod 13, a concave potential is formed in an axis center portion to focus the ion around the axis by the applied AC voltage. In an axial direction of the quadrupole rod 13, an inclined DC potential is formed on a beam axis by mainly the front electrode 12 and the rear electrode 17. The ion is trapped in the quadrupole mass separator 11 by the concave potential and the inclined DC potential. Accumulation and emission of the ion are sequentially performed by mainly changing the voltages at the front electrode 12 and the rear electrode 17.

A mass spectrometry sequence will be described below.

MS analysis and $MS^n$ analysis can be cited as an example of the mass spectrometry sequence. In the MS analysis, an amplitude of an AC voltage is changed to trap the ion, the ion is selectively ejected in an ion beam traveling axial direction, the ion is detected by the detector 20, and a molecular structure and a molecular formula of the sample are fixed from a relationship between a mass-to-charge ratio m/z and a detected ion current strength (relative value).

In the $MS^n$ analysis, a specific ion (precursor ion) is caused to selectively remain in the quadrupole mass separator 11, collision induced dissociation (CID) of the precursor ion is generated to create a fragment ion, and mass scanning and mass separation of the fragment ion are performed to finely investigate the molecular structure of the sample. The $MS^n$ analysis will be described in detail below. A filtered noise field (FNF) having frequencies except a specific frequency is provided to the blade electrode 14 to eject ions except the specific precursor ion to the outside of the quadrupole mass separator 11, thereby selecting the specific precursor ion. The AC voltage having a resonant frequency of the precursor ion is applied to the precursor ion remaining in the quadrupole mass separator 11. At this point, a gas (such as helium, nitrogen gas, or argon) for collision induced dissociation is caused to flow in the quadrupole mass separator 11 to collide with the precursor ion, and the precursor ion is dissociated to create a product ion. The ion scanning and the mass separation of the created product ion are performed by changing the amplitude of the AC voltage amplitude applied to the quadrupole rod 13 and the blade electrode 14. At this point, only the product ion overcoming a potential barrier caused by a DC voltage applied to the front wire 15 is incident to the detector 20 by the extraction electric field of the rear wire 16. A variation in ion energy flowing in the ion detector is reduced by the front wire 15 and the rear wire 16, so that resolution can be improved.

Magnetic field (sector type) mass spectrometry, time of flight mass separation (TOFMS), ion trap mass spectrometry (ITMS), Fourier transform ion cyclotron resonance mass spectrometry (FT-ICRMS) in which the mass separation is performed by utilizing ion rotation motion generated by the magnetic field, or orbitrap mass spectrometry in which the ion rotation motion generated by the electric field is utilized can be used as a mass separation method except the quadrupole mass separator in which the quadrupole rod is used.

The detector will be described below.

In FIG. 1, the detector 20 exhibits a secondary electron photomultiplier provided with a conversion dynode 21. The ion is caused to collide with the conversion dynode 21 by the electric field that is generated by the voltage of several kilovolts applied to the conversion dynode 21, and the generated secondary electron 28 is amplified to a degree of the sixth power of ten by a multi-stage dynode 22. The amplified secondary electron 28 is taken out to the atmosphere using a current introduction terminal 25, further amplified by an amplifier circuit 26, and captured in a micro ammeter 27 to perform monitoring. For example, a Farady cup in which the ion is received by a cup-shaped electrode to measure an amount of generated secondary electron, a channeltron in which the electrode is not independently formed but constitutes a high-resistance pipe, a micro channeltron including channeltrons having diameters range from 10 to 20 micrometers and arrayed in plate, or a photomultiplier in which light is converted into a photoelectron by a photoelectric surface to amplify the generated secondary electron can be used as the ion detector.

The mass spectrometer includes an axis adjusting mechanism 30 on the ion traveling axis connecting a center axis of an ion beam outgoing port of the ion source 1 and a center axis of an incident port of the detector 20 such that center axes of the fine holes of the first orifice 3, the second orifice 6, and the third orifice 9 are aligned with one another. Therefore, in the mass spectrometer, the axis position adjustment can be performed at a micrometer level. The components, such as the octopole 8 and the quadrupole mass separator 11, which are disposed between the ion source 1 and the detector 20 can be adjusted by an axis adjusting mechanism (not illustrated). For the octopole 8 and the quadrupole mass separator 11, plural axis adjusting mechanisms 30 may be provided near the incident port and the outgoing port so as not to deviate (incline) the axis.

Figure 2A:
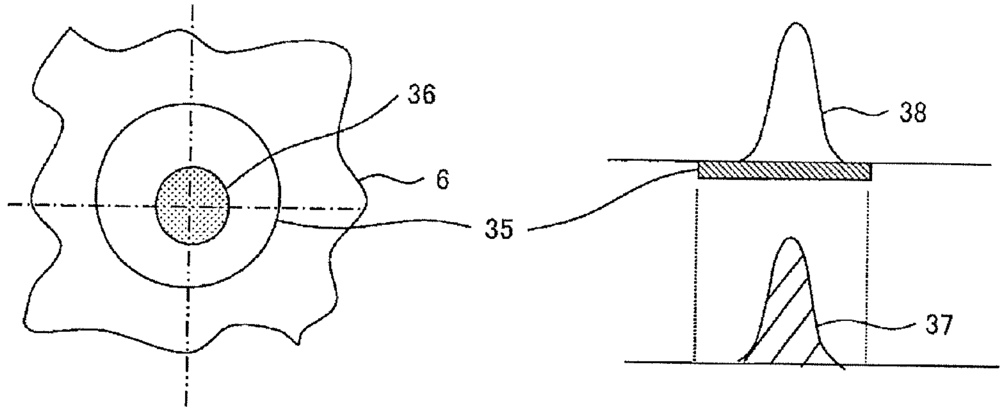
FIGS. 2A and 2B illustrate relationships between an axis deviation amount and a passing beam current amount.
Figure 2B:
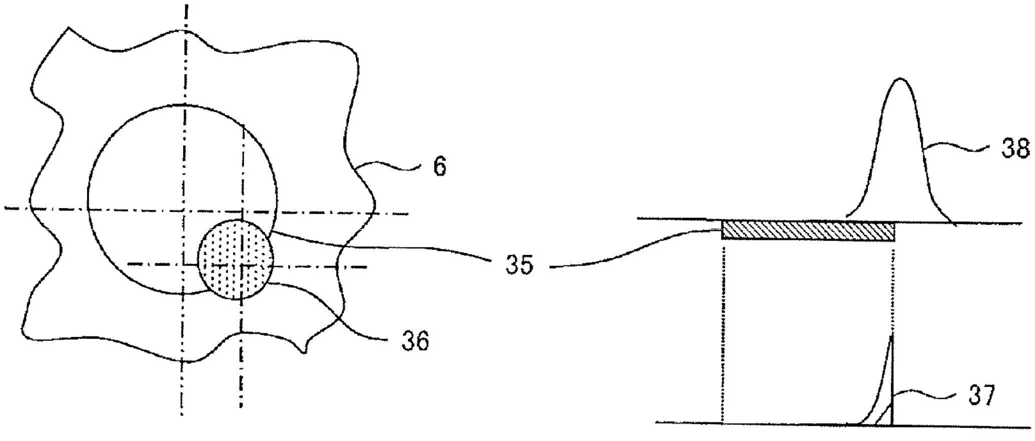

FIGS. 2A and 2B illustrate positional relationships between a fine hole 35 of the second orifice and an ion beam 36 passing through the fine hole of the first orifice when the small and large axis deviations are generated between the first orifice and the second orifice (left side), and intensity distributions 38 of the ion beam passing through the first orifice on the second orifice surface and states of an ion beam 37 passing through the second orifice (right side). Because a diameter of the first orifice is larger than a diameter of the second orifice, the ion beam 36 incident to a surface of the second orifice through the first orifice does not interfere with the fine hole 35 of the second orifice in case of small axis deviation. On the other hand, part of the ion beam passing through the first orifice does not pass through the fine hole 35 of the second orifice in case of large axis deviation, and the ion beam current reaching the detector is decreased to generate troubles such as sensitivity degradation of an apparatus and resolution degradation.

Therefore, the axes (positions) of the first orifice and the second orifice are adjusted to align the center axes by means of the axis adjusting mechanism 30 such that the ion beam passing through the first orifice can pass through the second orifice. Although the relationship between the first orifice and the second orifice is adjusted in the embodiment, the axis position adjustment may be performed in the components disposed between the ion source and the detector.

The invention will be described below referring to embodiments applied to specific apparatuses.

First Embodiment

Figure 3:
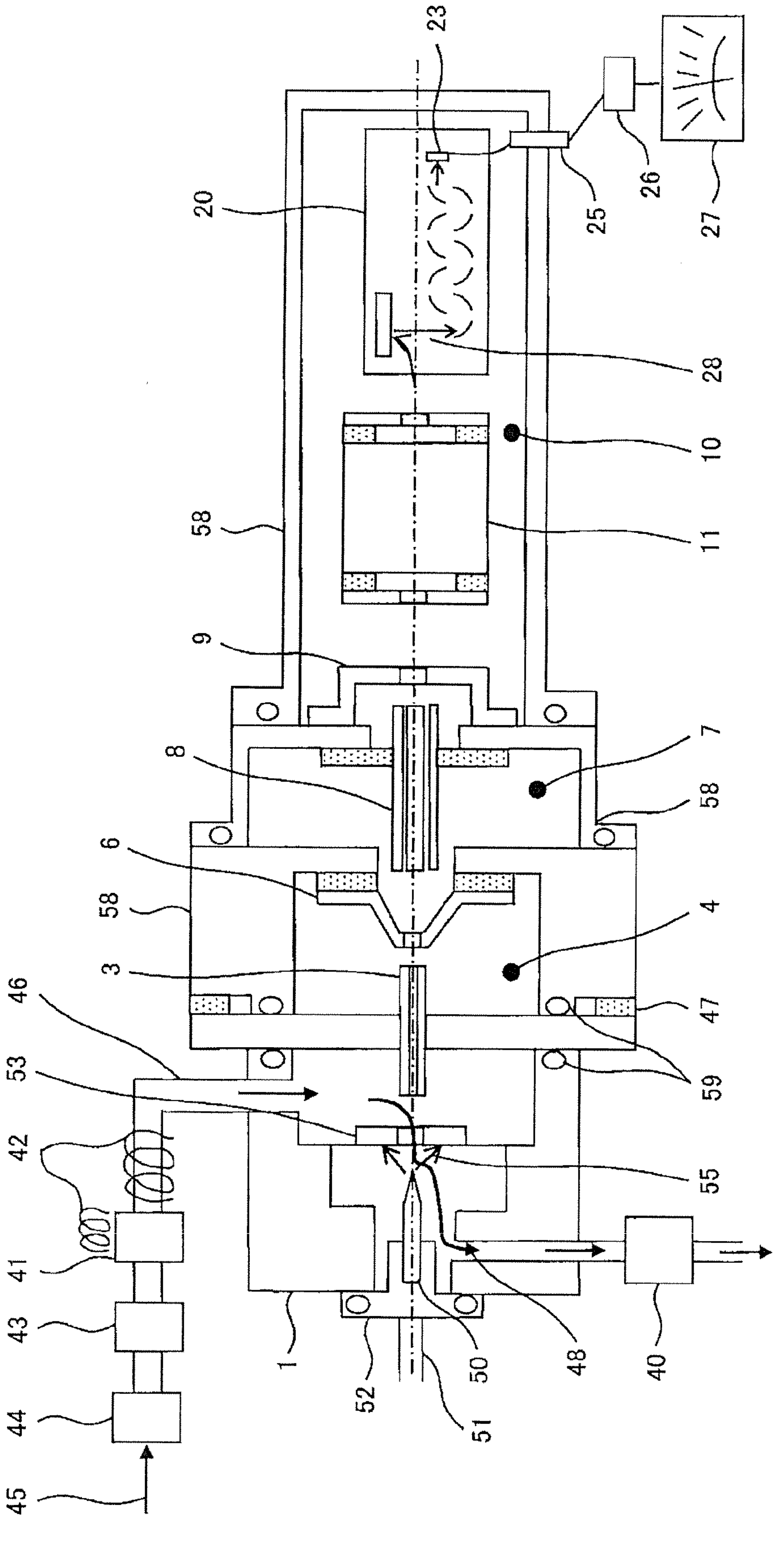
FIG. 3 illustrates an entire configuration of a mass spectrometer according to an embodiment of the invention in which APCI (Atmospheric Pressure Chemical Ionization) is used.

FIG. 3 illustrates an entire configuration of an apparatus in which APCI (Atmospheric Pressure Chemical Ionization) is used as the ion source in the apparatus of FIG. 1. In FIG. 1, the octopole 8 and the quadrupole mass separator 11 are illustrated in the perspective views. On the other hand, in FIG. 3, the octopole 8 and the quadrupole mass separator 11 are illustrated in a plan view. Hereinafter, the overlapping description is omitted.

Air 45 is taken in the ion source 1 by a suction pump 40. At this point, TCP (trichlorophenol) that is of a standard sample 41 is heated and vaporized by a heater 42. After a vaporized gas amount becomes constant while the standard sample 41 is maintained at a constant temperature, a flow rate of the air 45 is set through a filter 44 by a mass flow controller 43. The heater 42 is wound around pipe 46 located on a downstream side such that adhesion of a vaporized component of TCP to the pipe 46 is suppressed as much as possible. A voltage of several kilovolts is applied to a discharge needle 50 through a power cable 51 and a holder 52, which are connected to a power supply (not illustrated). A voltage lower than the voltage applied to the discharge needle 50 is applied to a counter electrode 53 that located several millimeters from a leading end of the discharge needle 50 (for positive ion). A corona discharge 55 is generated in the air by the potential difference. A voltage of several tens of volts is applied to the first orifice 3. The ion beam is extracted toward the detector 20 by the differential voltage. As illustrated in FIG. 3, contrary to the ion beam extraction direction, the air 48 containing the TCP sample gas flows from the counter electrode 53 to the discharge needle 50. The reason that the flow of the sample gas is set to the opposite direction to the ion beam extraction direction is that a reaction area where the desired ion reacts with radical and other ions is reduced to the minimum. The sample gas flows in the corona discharge area to generate the radical and other ions, which are the electrically neutral, in addition to the desired ion. The radical and other ions block the desired ionization to lower the desired ion current. Therefore, the flow of the sample gas is set to the opposite direction to the ion beam extraction direction in order to minimize the reaction area where the desired ion reacts with the radical and other ions.

The whole of ion source is heated to a high temperature by a heater (not illustrated). The first orifice 3 includes an elongated pipe in the center portion thereof. The elongated pipe has an inner diameter of about 100 micrometers and a length of 10 millimeters. The first differential pumping chamber 4 located on the downstream side of the first orifice 3 is connected to a diaphragm pump (not illustrated) having a pumping speed of several tens of liters per minute, and the degree of vacuum of the first differential pumping chamber 4 becomes about 1000 pascals. Because the air containing the sample gas is adiabatically expanded when flowing in the first orifice 3, the temperature of the air containing the sample gas is lowered to generate clustering of the ion. When the clustering of the ion is generated, the mass spectrometry cannot correctly be performed. The sample gas adheres to the surface of the first orifice 3 to form an insulating film, and the charge is accumulated on the insulating film to generate a drift of the ion beam. Therefore, the first orifice 3 is heated to several hundreds of degrees Celsius by a heater (not illustrated) in order to prevent the drift from generating.

Similarly the second orifice 6 is heated by a heater (not illustrated). The first orifice 3 is fixed to a vacuum chamber 58 with an insulator 47 and a vacuum O-ring 59 interposed therebetween. The O-ring 59 is used to retain the vacuum. The ion is accelerated to enter the octopole 8 by the potential difference between the first orifice 3 and the second orifice 6. A hole having a diameter of several hundreds of micrometers is made in the second orifice 6. The second differential pumping chamber 7 located on the downstream side of the second orifice 6 is connected to a split-flow turbo molecular pump (not illustrated) having a pumping speed of several liters per second through a second pumping port. The air containing the sample gas flowing in the second differential pumping chamber 7 is restricted by a flow rate narrowing-down effect of the second orifice 6, and the degree of vacuum of the second differential pumping chamber 7 becomes several pascals. The octopole 8 is disposed in the second differential pumping chamber 7. The octopole 8 performs the above-described operation, and causes the ion beam to be focused and to pass through the fine hole of the third orifice 9, so that the ion beam is incident to the analytical chamber 10. The third orifice 9 has the hole diameter of about 1 millimeter. The pumping port of the analytical chamber 10 located on the downstream side of the third orifice 9 is connected to a split-flow turbo molecular pump (not illustrated) having a pumping speed of several tens of liters per second through a first pumping port. The analytical chamber 10 becomes the degree of vacuum of the minus third power of ten. The operation of the quadrupole mass separator 11 disposed in the analytical chamber 10 is described above. The scanned and separated ion having the mass-to-charge ratio m/z is incident to the detector 20.

The output of the detector 20 is obtained as follows.

Figure 4:
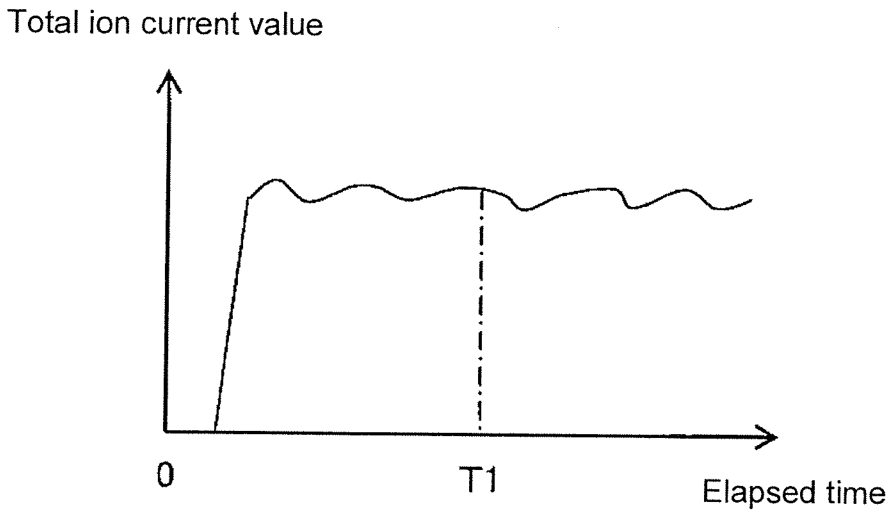
FIG. 4 illustrates a relationship between an output current value of a detector and an elapsed time.

FIG. 4 illustrates a temporal change of the total ion current value that is the output of the detector 20 when the quadrupole mass separation is not performed. FIG. 4 shows that the total ion current value has a variation of about plus or minus several percent. Although the total ion current value has the above-described variation when the apparatus runs normally, the total ion current value of the detector is largely decreased, when the amount of sample gas that is source material flowing in the ion source is decreased due to the adhesion of the sample on a cold spot on a pipe, or when an ion beam passage rate is decreased due to clogging of the orifice.

Figure 5:
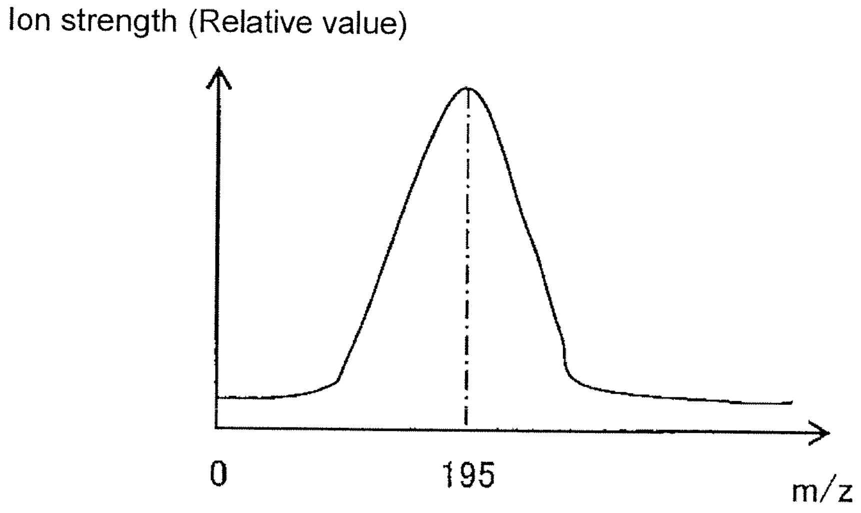
FIG. 5 illustrates a relationship between a mass-to-charge ratio m/z and ion strength (relative value)

FIG. 5 illustrates a relationship between the mass-to-charge ratio m/z and the ion strength (relative value) when the quadrupole mass separation is performed at a time T1 of FIG. 4. Because TCP is used as the standard sample, a peak is observed at the mass-to-charge ratio m/z of 195.

A specific configuration of the axis adjusting mechanism 30 will be described below.

Figure 6:
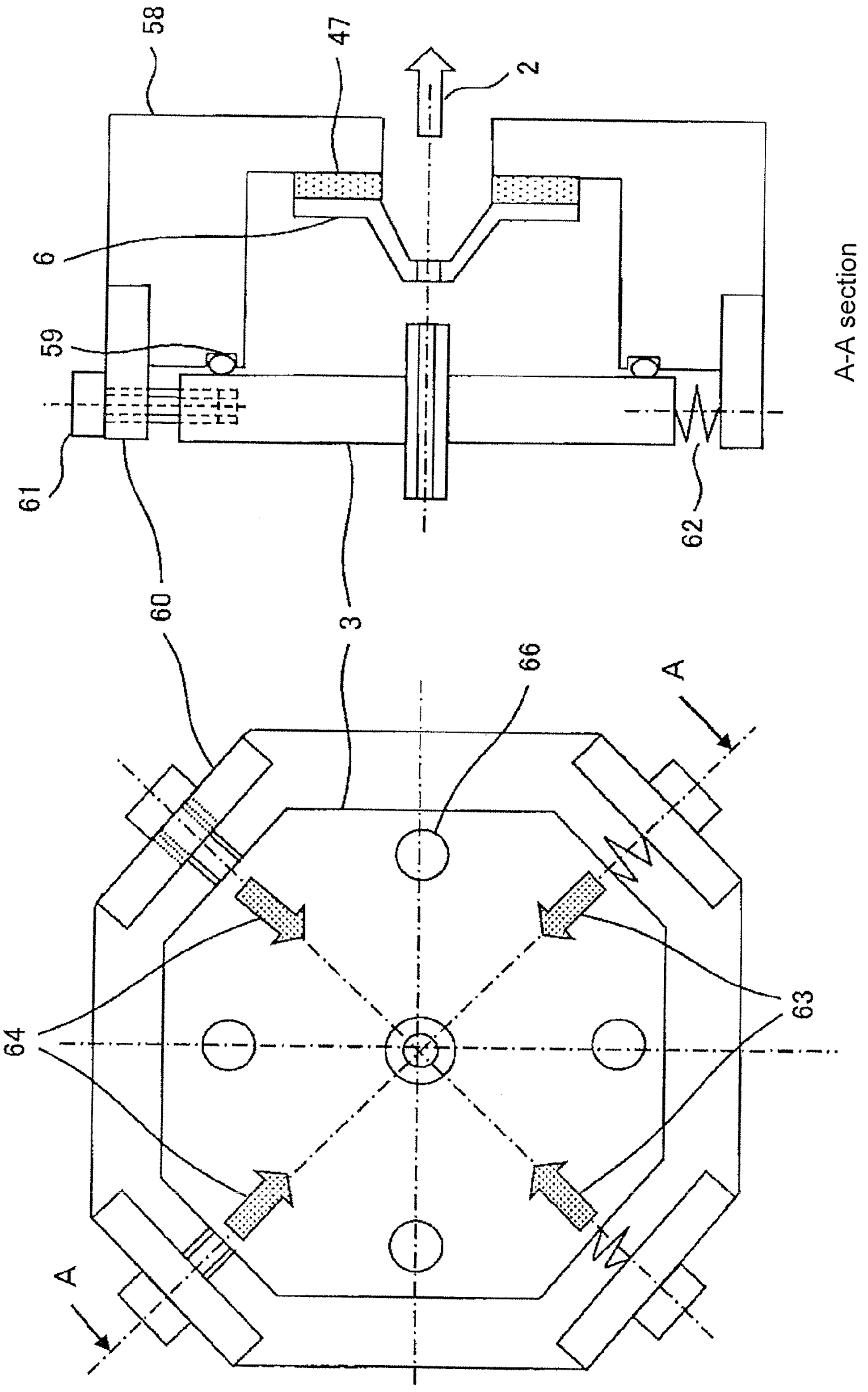
FIG. 6 illustrates an axis position adjusting mechanism of a first orifice.

FIG. 6 illustrates the axis adjusting mechanism between the first orifice and the second orifice as an example of the axis adjusting mechanism. A adjustment screw mounting plate 60 is fixed to the vacuum chamber 58. Screw holes are made in the first orifice 3, and adjustment screws 61 are threaded in the screw holes. An elastic member such as a spring 62 is fixed to a position opposite the adjustment screws 61. The position of the first orifice 3 can be adjusted by a balance between a spring repulsive force 63 of the spring 62 and a pressing force 64 of the adjustment screw 61. A trapezoidal disc spring as the spring 62 is used to generate the large repulsive force in the narrow area. The identical mechanism is provided in a direction orthogonal to the adjustment direction, and the identical adjustment can be performed. The adjustment can be performed in the two directions orthogonal to each other by the method. Alternatively, the position of the fine hole may be adjusted not two-dimensionally but three-dimensionally including a trolling angle by additionally providing an inclination mechanism (not illustrated). FOMBLIN having a sufficiently low saturated vapor pressure is applied to the O-ring 59 such that friction between the first orifice 3 and the vacuum chamber 58 is reduced to improve slippage and such that apparatus performance is not adversely affected. The first orifice 3 can be fixed using a fixing screw 66 after the axis adjustment. A distance of movement and adjustment of the first orifice 3 is several hundreds of micrometers. Similarly the second orifice 6 is fixed to the vacuum chamber 58 with the insulator 47 interposed therebetween. The ion beam 2 is extracted onto the detector side by the potential difference between the first orifice 3 and the second orifice 6. When a fine screw having a screw pitch of 0.5 mm is used as the adjustment screw, because the screw travels by 0.5 mm per rotation of 360°, the movement and adjustment of about 10 μm can be performed by 7°. For the finer adjustment, a piezoelectric element, a servo motor and a ball screw, and a precisely direct acting stage may be used as a driving structure, to allow the adjustment to be performed at a nanometer level at the minimum. FIG. 6 illustrates the axis position adjusting mechanism between the first orifice and the second orifice. Similarly the axis position adjusting mechanism (not illustrated) may be provided among the first orifice 3, the quadrupole mass separator 11, and the detector 20 to perform the axis adjustment.

Sometimes the vaporized gas of the lubricant agent is generated when the lubricant agent is used in the O-ring. In such cases, possibly the ionization of the sample is blocked to decrease the necessary ion current value. Also, a noise component is increased to possibly degrade an S/N ratio. On the other hand, when the lubricant agent is not used, the friction between the first orifice 3 and the O-ring 59 is increased to twist the O-ring 59, which sometimes causes a leak of the vacuum chamber.

Figure 9:
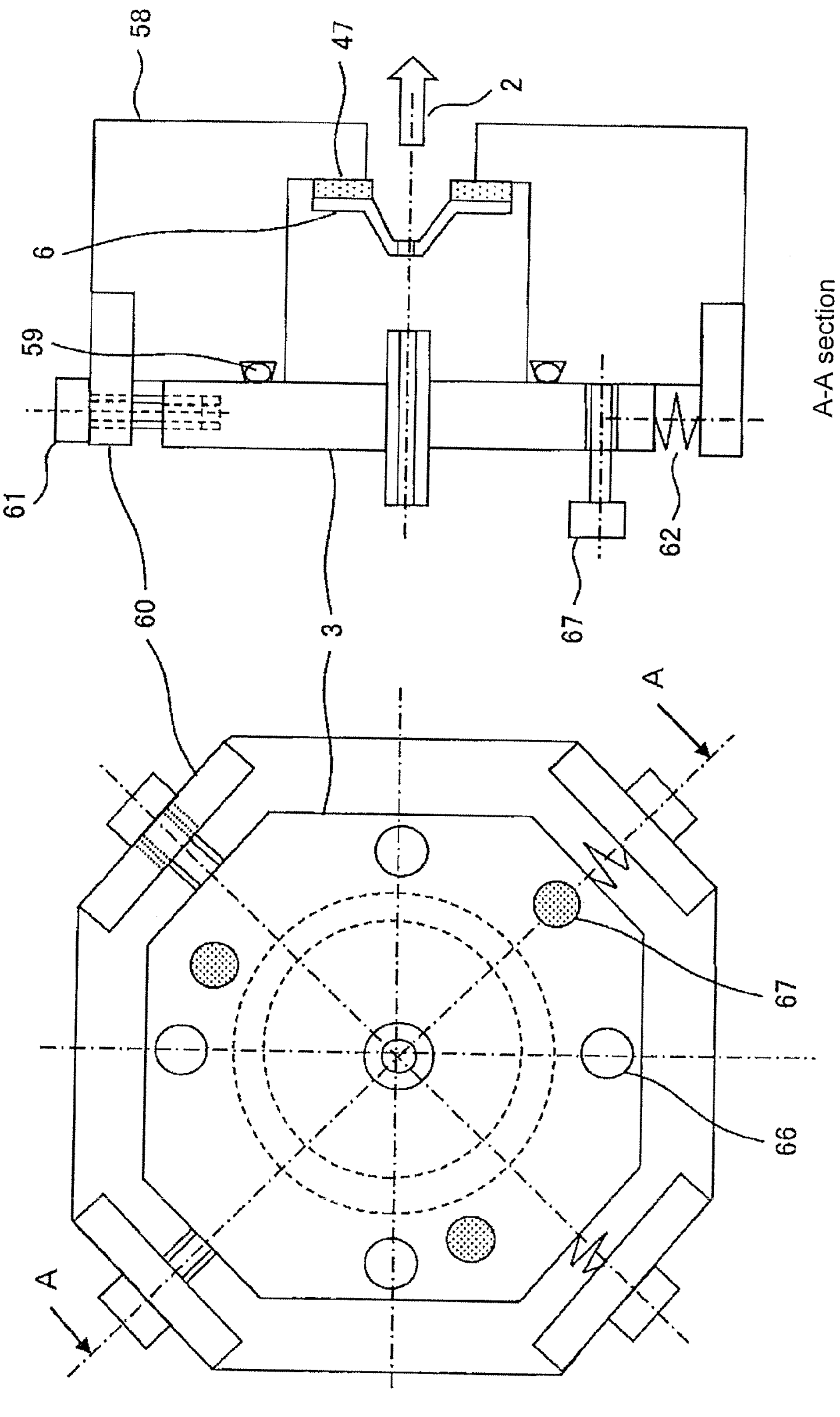
FIG. 9 illustrates an axis position adjusting mechanism of a first orifice.

Therefore, as illustrated in FIG. 9, a mechanism that moves the first orifice 3 in the direction identical to that of the beam axis is provided to separate the first orifice 3 and the O-ring 59, and the first orifice 3 is moved in the direction orthogonal to the axial direction. A dovetail groove (a sidewall of a groove in which the O-ring is accommodated is inclined) is provided in order that the generation of the twist of the O-ring 59 and the generation of the leak are prevented to lessen the motion of the O-ring 59 as much as possible.

Figure 10A:
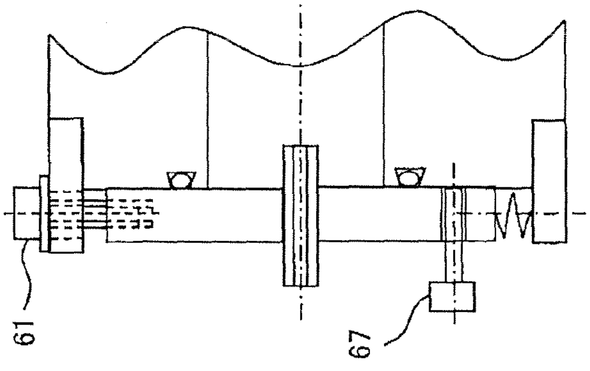
FIGS. 10A to 10D illustrate an axis position adjusting mechanism of a first orifice.
Figure 10B:
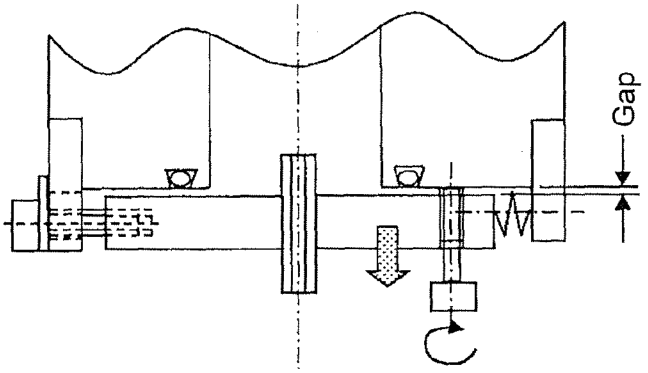
Figure 10C:
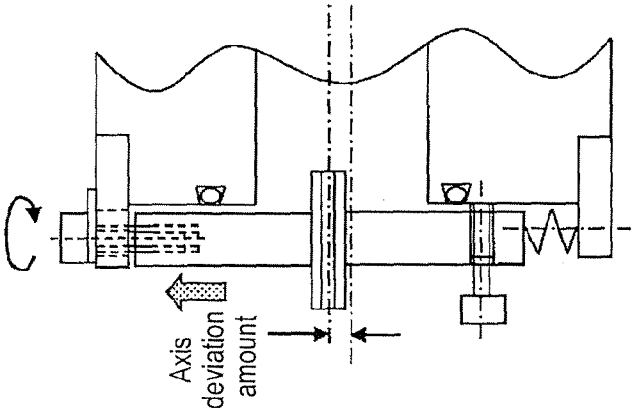
Figure 10D:
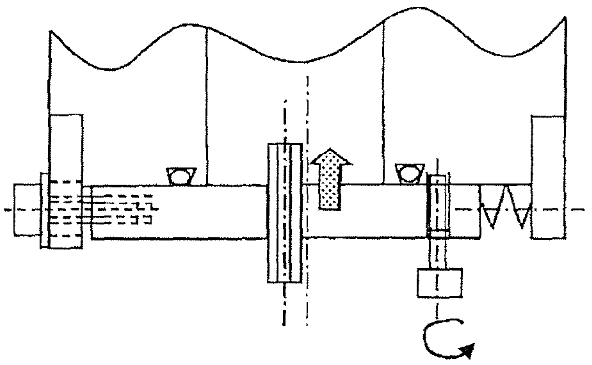

At this point, the first orifice 3 is moved as illustrated in FIGS. 10A to 10D. The first orifice 3 is moved from a state (FIG. 10A) in the beam axis direction to the upstream side (the side of the ion source 1) by a screw 67 (FIG. 10B). The first orifice 3 is moved in the direction orthogonal to the beam axis by the adjustment screw 61 (FIG. 10C). The first orifice 3 is moved in the beam axis direction to the downstream side (the side of the detector 20) by the screw 67 and fixed by the fixing screw 66 (FIG. 10D).

The mechanism is used in each orifice and each mass separator to adjust the axis position.

An axis adjusting method will be described below.

Figure 7:
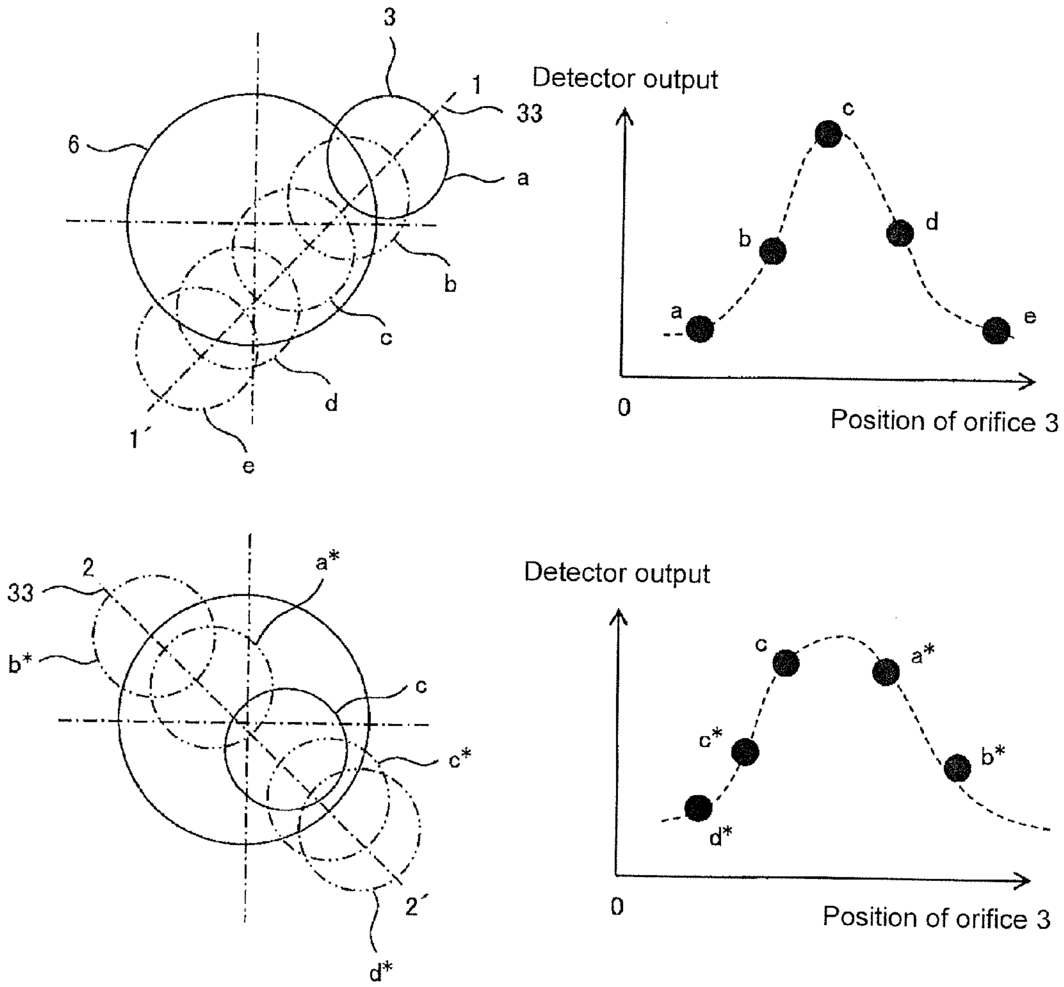
FIG. 7 illustrates an axis position adjusting method.

FIG. 7 illustrates a method for adjusting the axis deviation. The first orifice 3 is moved along an axis 1-1'. The right side in the upper stage of FIG. 7 illustrates a transition of the beam current value when the first orifice 3 passes through the fine hole of the second orifice 6. In FIG. 7, the first orifice 3 is moved in the direction of a→e. The output signal of the detector becomes the maximum at the position c. Then the adjustment is performed in the direction of 2-2' illustrated in the lower stage of FIG. 7. First the first orifice is located in the position c. When the first orifice is moved in the direction of c→a*→b*, the detected current value is decreased. Therefore, the first orifice is returned and moved in the direction of b*→c*→d*. The right side in the lower stage of FIG. 7 illustrates the change of the detected signal. The detected signals are connected by an approximate curved line to determine the first orifice position in which the detected signal is maximized, and the first orifice is adjusted to the position and fixed. Then the axis deviation adjusting work is ended. In the embodiment, the axis adjustment is less frequently performed. However, actually it is necessary to repeatedly perform the adjustment plural times. In the embodiment, the adjustment is manually performed. Alternatively, the adjustment may automatically be performed such that the current value of the detector becomes the maximum, when a combination of a motor (stepping motor) and a ball screw is used to drive the orifice, or when a combination of the piezoelectric element and precision stage is used to drive the orifice.

Because sizes of maintenance components such as the orifice vary within mechanical tolerances, it is necessary to perform the axis adjustment after the maintenance. Because the orifice is heated by the heater as described above, the center axis position of the fine hole changes in the transient state. Therefore, the adjustment is efficiently performed after the apparatus is thermally stabilized in the running state. Whether the apparatus is thermally stabilized can be determined based on whether the signal of the detector 20 in the ion beam detecting state is substantially kept constant (the variation falls within a predetermined range). It is necessary that the axis position adjustment is performed when the apparatus runs normally. The stability of the apparatus is confirmed by the variation in total ion current value that is a kind of the detector output and the mass-to-charge ratio m/z in which the peak of the ion intensity (relative value) is observed as illustrated in FIGS. 4 and 5. The variation in total ion current value and the mass-to-charge ratio m/z are monitored in performing the axis adjustment. When an abnormality is generated, if a warning is issued to an operator to stop the axis adjustment and the repair or maintenance of the apparatus is performed, operability, performance, and reliability of the apparatus are improved.

Figure 11:
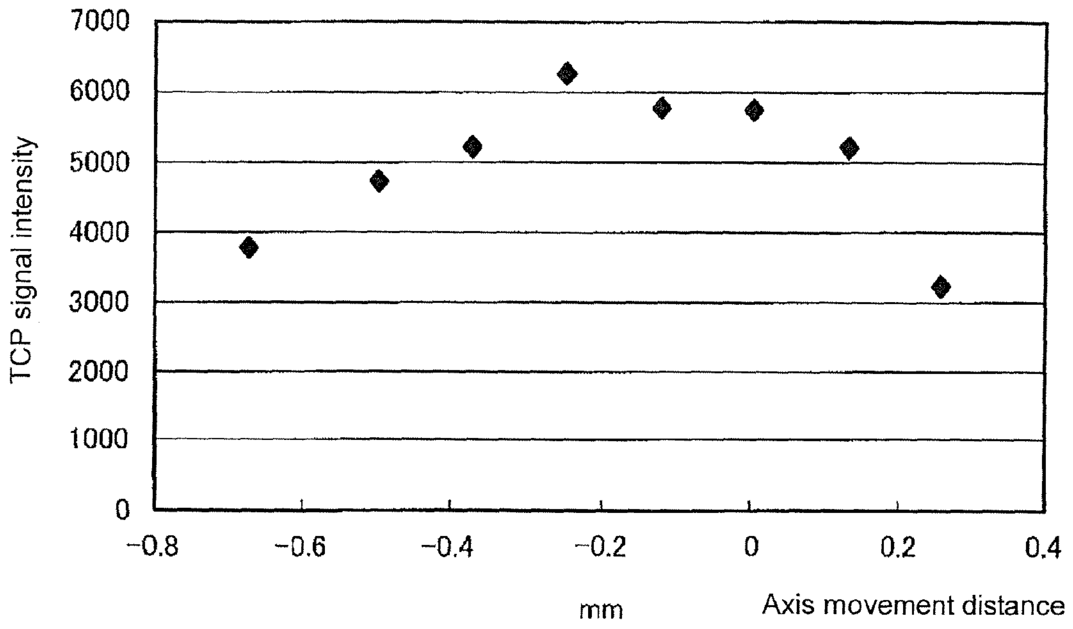
FIG. 11 illustrates a change in signal amount by axis position adjustment.

FIG. 11 illustrates an example of test result. In FIG. 11, a horizontal axis indicates a movement distance in the direction orthogonal to the beam axis, and a vertical axis indicates the total ion current value (TCP signal intensity). The change of maximum/minimum=about two times is generated by the axis adjustment, and the maximum performance can be exerted by the current correction using the axis adjustment mechanism.

Thus, the axis adjusting mechanism is used to effectively reduce the mechanical tolerance.

Second Embodiment

Figure 8:
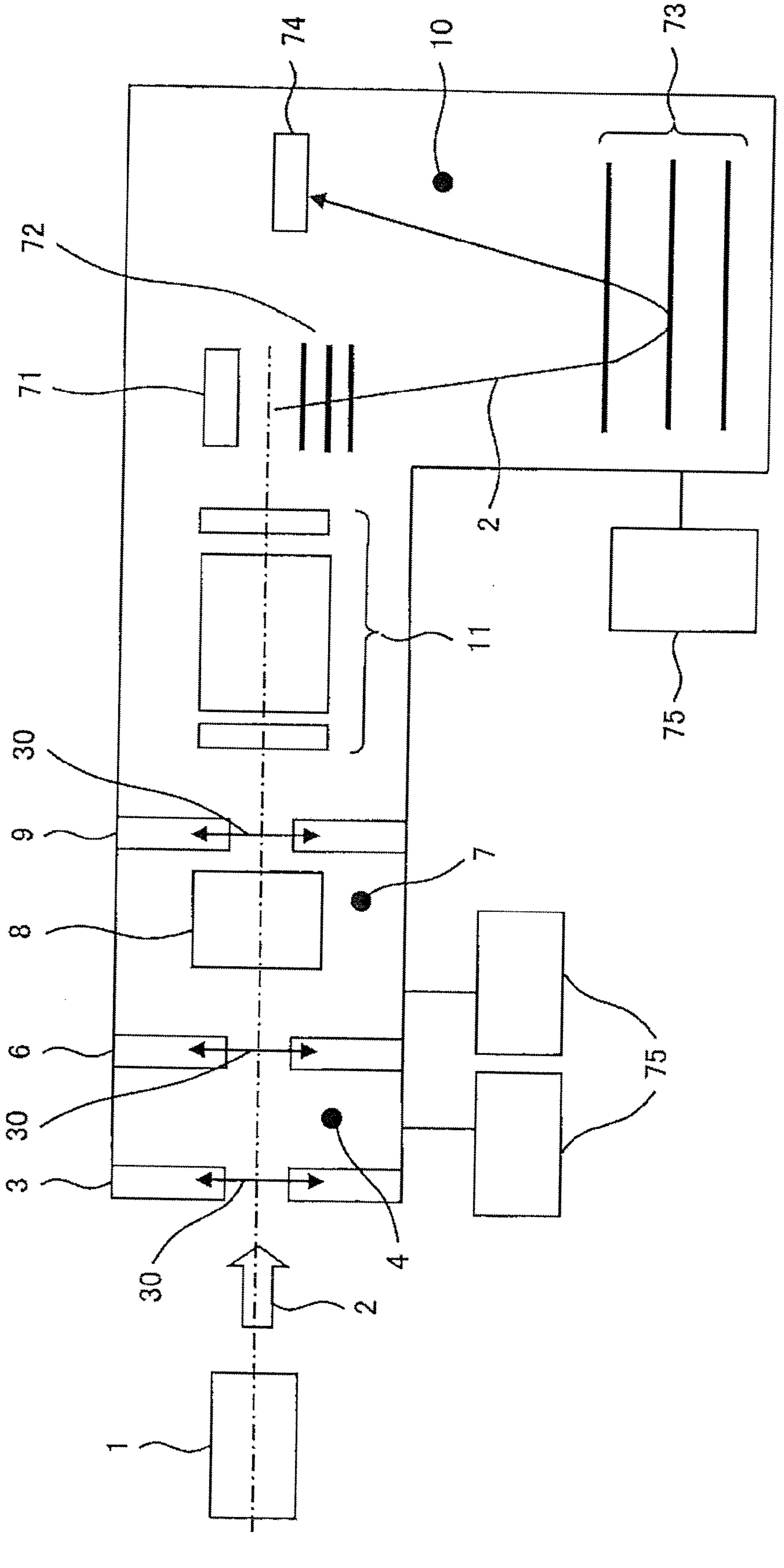
FIG. 8 illustrates an entire configuration of a TOF (Time Of Flight) mass spectrometer according to an embodiment of the invention.

FIG. 8 illustrates a TOF (Time Of Flight) mass spectrometer provided with the axis adjusting mechanism. The ion is accelerated in the orthogonal direction by an acceleration electric field of several hundreds of volts to several kilovolts applied to a push-out electrode 71 and an acceleration pull-out electrode 72, the ion deflects through the ion reflector 73 which is called a reflector reaches the detector, and the ion reaches the detector such as a multi channel plate 74. The variation in initial energy of the ion is corrected to equalize a total flight time of the ions having the identical mass-to-charge ratio m/z using the reflector, so that mass resolution can be enhanced.

The miniaturization of the mass spectrometer can also be implemented by utilizing the axis adjusting mechanism 30 in each orifice.

Description of Reference Numerals

1 ion source
3 ion beam
3 first orifice
4 first differential pumping chamber
5 rough vacuum pump
6 second orifice
7 second differential pumping chamber
8 octopole
9 third orifice
10 analytical chamber
11 quadrupole mass separator
12 front electrode
13 quadrupole rod
14 blade electrode
15 front wire
16 rear wire
17 rear electrode
18 main vacuum pump
20, 23 detection unit
21 conversion dynode
22 dynode
25 current introduction terminal
26 amplifier circuit
27 micro ammeter
28 secondary electron
30 axis adjusting mechanism
33 adjustment direction
35 fine hole
36 ion beam that already passing through first orifice
37 ion beam that already passing through second orifice
38 intensity distribution
40 suction pump
41 standard sample
42 heater
43 mass flow controller
44 filter
45 air
46 pipe
47 insulator
48 air containing sample gas
50 discharge needle
51 power cable
52 holder
53 counter electrode
55 corona discharge
58 vacuum chamber
59 O-ring
60 adjustment screw mounting plate
61 adjustment screw
62 spring
63 spring repulsive force
64 screw pressing force
65 first fine hole
66 fixing screw
67 screw
71 push-out electrode
72 pull-out electrode
73 ion reflector (reflector)
74 multi channel plate
75 vacuum pump

What is claimed is:

1. A mass spectrometer comprising:
an ion source;
a detector that is adapted to detect an ion;
an orifice and a mass separator that are disposed between the ion source and the detector; and
an axis adjusting mechanism that is adapted to adjust axis positions of the orifice in two orthogonal directions such that an opening of the orifice is disposed on a line through the ion source.

2. The mass spectrometer according to claim 1, wherein
the axis adjusting mechanism is composed of an adjustment screw and an elastic member that is disposed opposite to the adjustment screw in relation to the orifice.

3. The mass spectrometer according to claim 1, wherein the axis adjusting mechanism includes a piezoelectric element or a servo motor.

4. A method for adjusting a mass spectrometer including:
an ion source;
a detector that detects an ion;
an orifice and a mass separator that are disposed between the ion source and the detector; and
an axis adjusting mechanism that adjusts axis positions of the orifice, wherein the orifice is moved in two orthogonal directions such that an opening of the orifice is disposed on a line through the ion source.

5. The mass spectrometer adjusting method according to claim 4, wherein
the adjustment is performed after a variation in signal from the detector of the mass spectrometer falls within a predetermined range.

* * * * *